June 13, 1961

A. W. VINAL 2,988,732

BINARY MEMORY SYSTEM

Filed Oct. 30, 1958

4 Sheets-Sheet 1

INVENTOR
ALBERT W. VINAL
BY Ralph R Barnard
ATTORNEY

June 13, 1961

A. W. VINAL 2,988,732

BINARY MEMORY SYSTEM

Filed Oct. 30, 1958

4 Sheets-Sheet 2

2,988,732
BINARY MEMORY SYSTEM
Albert W. Vinal, Owego, N.Y., assignor to International Business Machines Corporation, New York, N.Y., a corporation of New York
Filed Oct. 30, 1958, Ser. No. 770,667
13 Claims. (Cl. 340—174)

The present invention relates to means for electrically storing digital information and more particularly to a new and improved electrical instrumentation of a ferrite apertured plate memory system.

The two directions of magnetic remanence of a magnetic core provide two bistable states which may represent a bit of binary information. The prior art has recognized these potentialities and, as a result, has utilized an array of toroidal cores, each spaced and oriented with respect to the other in accordance with rectangular coordinates for the purpose of providing a high-capacity, high-speed, random access memory. Therein, the magnetic state of each toroidal core represents a bit of electrical information. Address windings are passed through each core, and the switching characteristics of the hysteresis loop of each participates in the addressing during the selection of that core for purposes of writing in or reading out binary electrical information.

The making, testing and assembling of individual toroidal cores was a relatively economical task as long as the number of cores numbered several thousand or less. However, as it was desired to increase the capacity of storage utilizing thousands of cores, the assembly of one core with respect to the other became laborious, costly and relatively unsound structurally. For example, a toroidal core could not withstand large amounts of vibration without a modification of its position with respect to the others in the array, thereby leading to adverse abrasion of supporting address wires. In addition, the electrical power requirement for modifying the state of saturation in the individual cores, as desired, was quite high.

As a result of the above, Radio Corporation of America developed a modified magnetic memory comprising discrete cells of ferrite integrally formed into one solid slab (plate) with each ferrite cell having a hole or aperture passing therethrough. Each plate then acts as a core memory plane in a manner very similar to that provided by the rectangular memory plane of cores according to the prior art. This structure is known as a ferrite apertured plate and is described in considerable detail in an article entitled "Ferrite Apertured Plate for Random Access Memory" published in the Proceedings of the IRE, page 325, volume 45. This ferrite apertured plate may be mounted in a cooperative relationship with additional ferrite apertured plates to provide a bistable memory system with a relatively large capacity. Such construction provides a strong, mechanical structure which will withstand considerable vibration without adverse effects. The physical dimensions of ferrite apertured plate storage is considerably less than a toroidal core storage of equal capacity. Moreover, the apertured plates arranged in this manner require considerably less current during the writing and reading operations. Notwithstanding the other advantages, the ferrite apertured plate storage requires comparatively little labor and cost in its manufacture because of the relative ease of construction. One of the reasons for this is the axial registry of the corresponding apertures of adjacent plates such that two coordinate address wires may be passed therethrough.

As described in the above-identified publication, a third winding is effectively passed through each aperture of each plate by utilizing a printed circuit technique. During the writing cycle, a current pulse of one polarity, with half the magnitude necessary to reversibly change the direction of the magnetic saturation of each ferrite cell, is selectively applied through each of the coordinate access wires of a particular apertured cell. Moreover, an inhibit current pulse of the other polarity, having half the magnitude necessary to reversibly change the direction of magnetic saturation, is applied to the third winding whenever it is desired that the addressed or selected apertured cell not change its state of magnetic saturation in accordance with the binary bit being written into storage. On the other hand, during the read cycle, a current pulse of the other polarity, with half the magnitude necessary to reversibly change the direction of the magnetic saturation of a ferrite aperture, is selectively applied through each of the coordinate address wires for the selected aperture. Any change of magnetic saturation of the ferrite aperture is detected by a voltage being induced in the third (printed) wire. The read cycle address pulses will be in a proper direction to change the state of saturation depending upon whether or not the ferrite aperture was storing a binary bit represented by a condition of magnetic saturation, which could be changed by the application of the reading address pulses.

Except where there is a coincidence of the two coordinate read or write address pulses at a particular apertured cell, the read and write address pulses being applied to the coordinate address conductor have only half the magnitude necessary to change the condition of magnetic saturation for each of the ferrite apertured cells which the address wires pass through. These latter apertured cells are driven only half-way toward the other condition of magnetic saturation for the duration of the read or write current address pulses, and then they are returned to their initial remanent condition. These flux changes cause incremental induced voltages in the series connecting third (printed) winding having an instantaneous sum which may be very large compared to the voltage induced therein by the change of the coincidentally addressed apertured cell from a magnetic remanent condition of a first polarity to the magnetic remanent condition of the other polarity. Each of these unwanted induced voltages is referred to as half-select noise voltage and may be collectively represented by a total voltage which will be many times the desired signal during the read operation. As a result, it is often difficult to detect the presence of the desired signal. To overcome this problem, the RCA publication referred to above describes the use of a second ferrite apertured plate identical with the first, except that the third winding of each is connected with respect to the other so that the half-select noise voltage which is generated in each will be equal and opposite; whereas, the desired signal is not. Such a core memory requires two ferrite apertured plates for each bit stored in the memory.

This technique would be satisfactory except for the fact that each of the ferrite apertured cells does not have a hysteresis loop with as high a degree of squareness as the toroidal cores. As a result, the magnitude of the address currents providing the half-selection for each coordinate have to be controlled with a high degree of accuracy. Otherwise, considerable noise would be generated during the readout operation, and the reliability with which the coincident half-addressed current pulses change the state of the selected ferrite aperture will not be adequate. Based on these short-comings of the ferrite apertured plates, the read-write circuits connected to each of the coordinate address lines have to be designed with great care and considerable circuitry to provide the exact level of address current. Considering the frequency requirements of the memory system, the read-write circuits are further complicated by the fact that the direction or polarity of the current pulse passing through each of the address windings during the read-write operation is of opposite polarity. Using the prior art technique of utilizing a highly accurate current pulse driver for each address conductor, a random access memory having a reasonable storage capacity would require a component count and circuit complexity which would render its design unsatisfactory.

One way of avoiding this problem has been to drive a ferrite apertured plate memory utilizing two plates per bit through a switch comprising a ferrite apertured plate for each pair of apertured plates corresponding to a bit of binary information. By using a ferrite apertured switch, which is addressed in the same manner as the apertured plates providing the memory, each bit location may be selected without half-addressing any of the other ferrite apertured cells along each of the coordinates. This method is designated in the above-referenced RCA publication as the "set a line" method.

Although the technique solved some of the problems, it greatly increased the complexity of the memory system and effectively utilized three ferrite plates per bit. In order to overcome the short-comings of the two-plate-per-bit technique, without resorting to the circuit complications of the "set a line" method, the present invention describes an addressing technique for providing good half-select noise cancellation and very reliable coordinate addressing by utilizing one read-write driver for all of the address windings along each coordinate and by controlling the address current pulse amplitude to a very high degree of accuracy by using a feedback technique. It should be noted that the feedback technique utilized must provide for accurately controlling the amplitude of the current address pulse through an inductive load (address conductor, etc.) when the current pulse has one polarity during the reading operation and the other polarity during the writing operation in a system where the total ferrite memory is operating at relatively high switching frequencies. Moreover, the technical problems are increased when it is desired that the addressing circuitry comprise solid-state devices, such as transistors, with operating parameters which vary with time, the operating point, and ambient temperature of the equipment.

It is, therefore, a primary object of the present invention to provide new and improved electrical instrumentation for a ferrite memory.

It is another object of the present invention to provide new and improved electrical instrumentation for a ferrite apertured plate memory.

It is still another object of the present invention to provide a new and improved ferrite memory system utilizing transistors in the addressing circuitry.

It is an additional object of the present invention to provide a new and improved ferrite memory system having a simplified addressing technique utilizing one read-write driver for all of the address lines along one coordinate.

It is still another object of the present invention to provide a new and improved ferrite apertured plate memory system utilizing a feedback technique in the addressing instrumentation for providing an accurate control of the amplitude of the current address pulses applied along each coordinate.

Other objects of the invention will be pointed out in the following description and claims and illustrated in the accompanying drawings which disclose, by way of examples, the principle of the invention and the best mode which has been contemplated of applying that principle.

Figure 2:
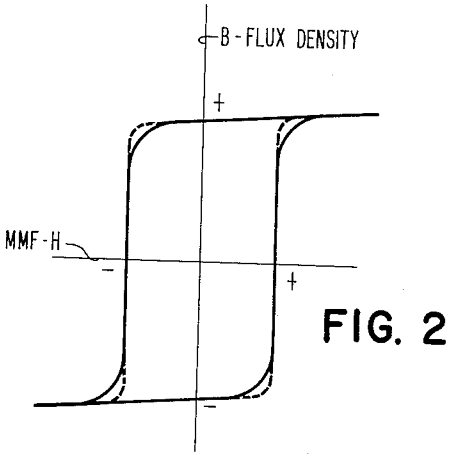
FIG. 2 shows a typical flux density B versus magnetomotive force H curve for a ferrite memory unit which will be generally helpful in understanding the use of magnetic remanent points along the hysteresis loop for the storage of binary information.
Figure 3A:
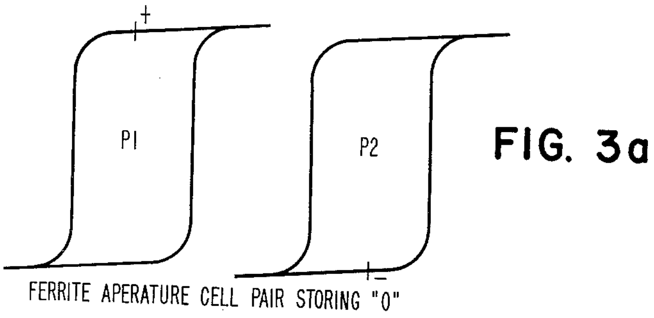
Figure 3B:
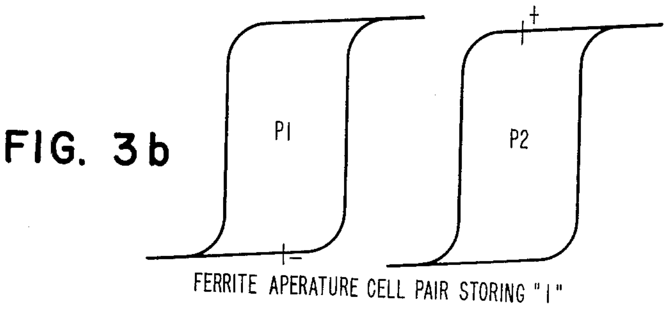
Figures 4A, 4B, 4C, 4D:
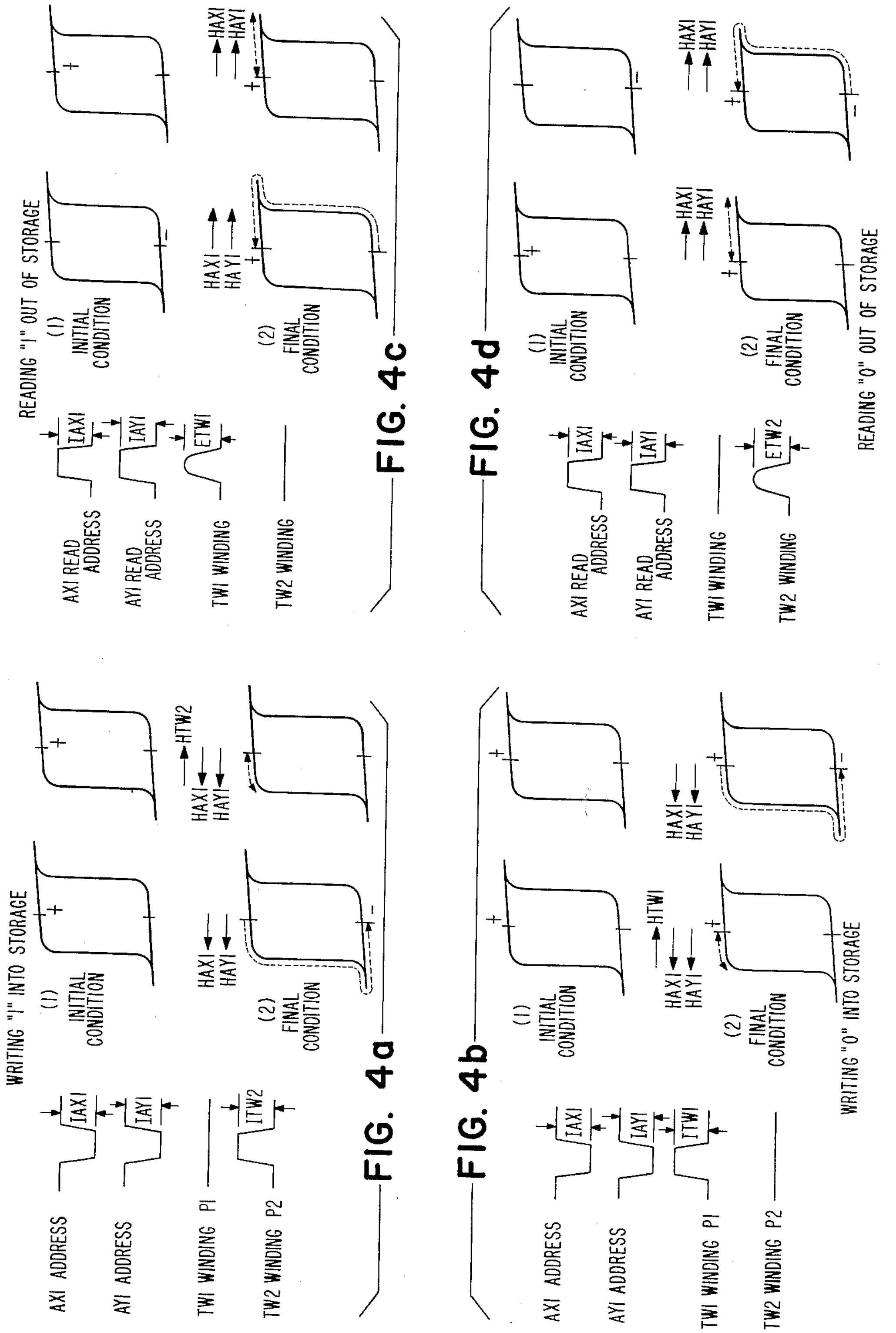
Figure 5:
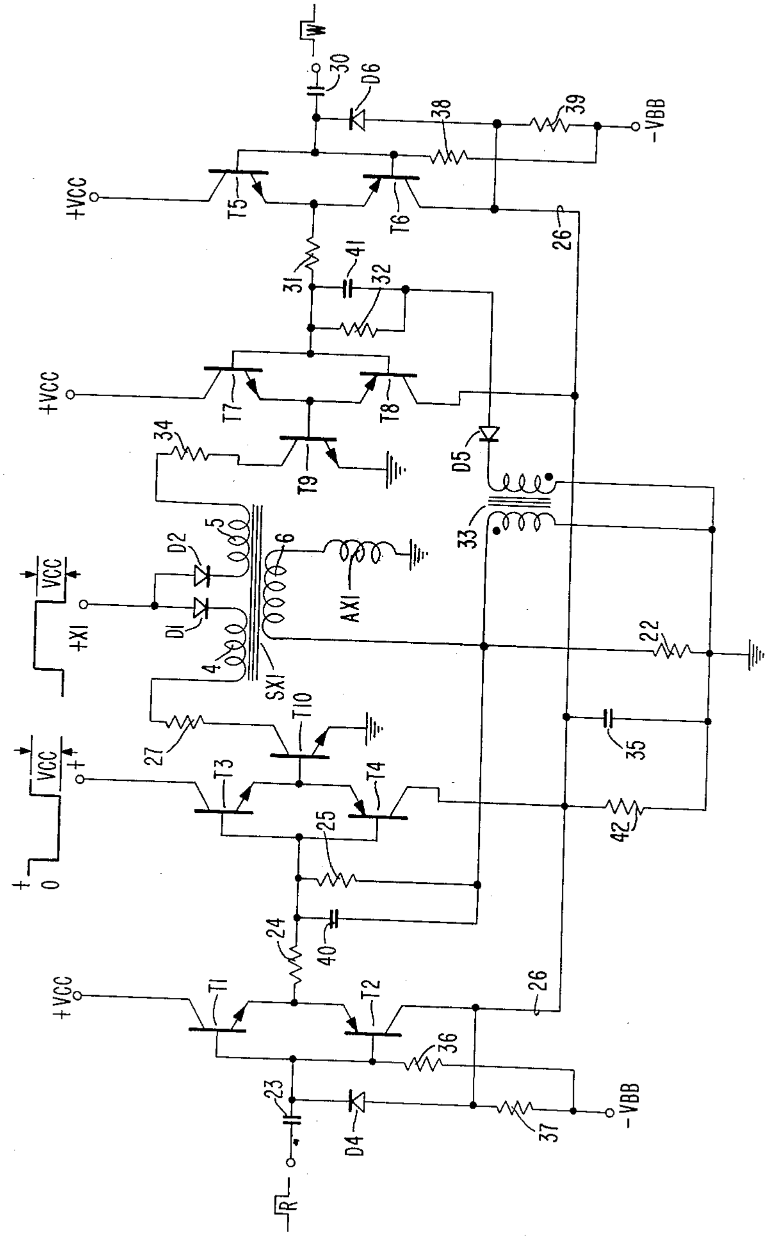

FIGS. 3*a* and 3*b* show a hysteresis loop, similar to that shown in FIG. 2, for each corresponding apertured cell of a two plate per bit memory system and will be helpful in understanding the application of the present invention to a ferrite apertured plate memory system;

FIGS. 4*a*, 4*b*, 4*c* and 4*d* diagrammatically show the modification of the hysteresis loops of FIGS. 3*a* and 3*b* during the write and read operations of an exemplary ferrite apertured plate memory system; and FIG. 5 shows a detailed electrical schematic of a feedback read-write driver operatively connected to one of plural transformer switches in providing the improved addressing of a magnetic memory system according to the present invention.

Identical components shown in more than one figure will be identified by the same numerals.

As indicated above, the present invention relates to an improved read-write addressing means for an information magnetic memory system utilizing two or more coordinates for addressing specific memory units within the memory by passing an address conductor serially through all of the memory units having an identical coordinate.

Figure 1:
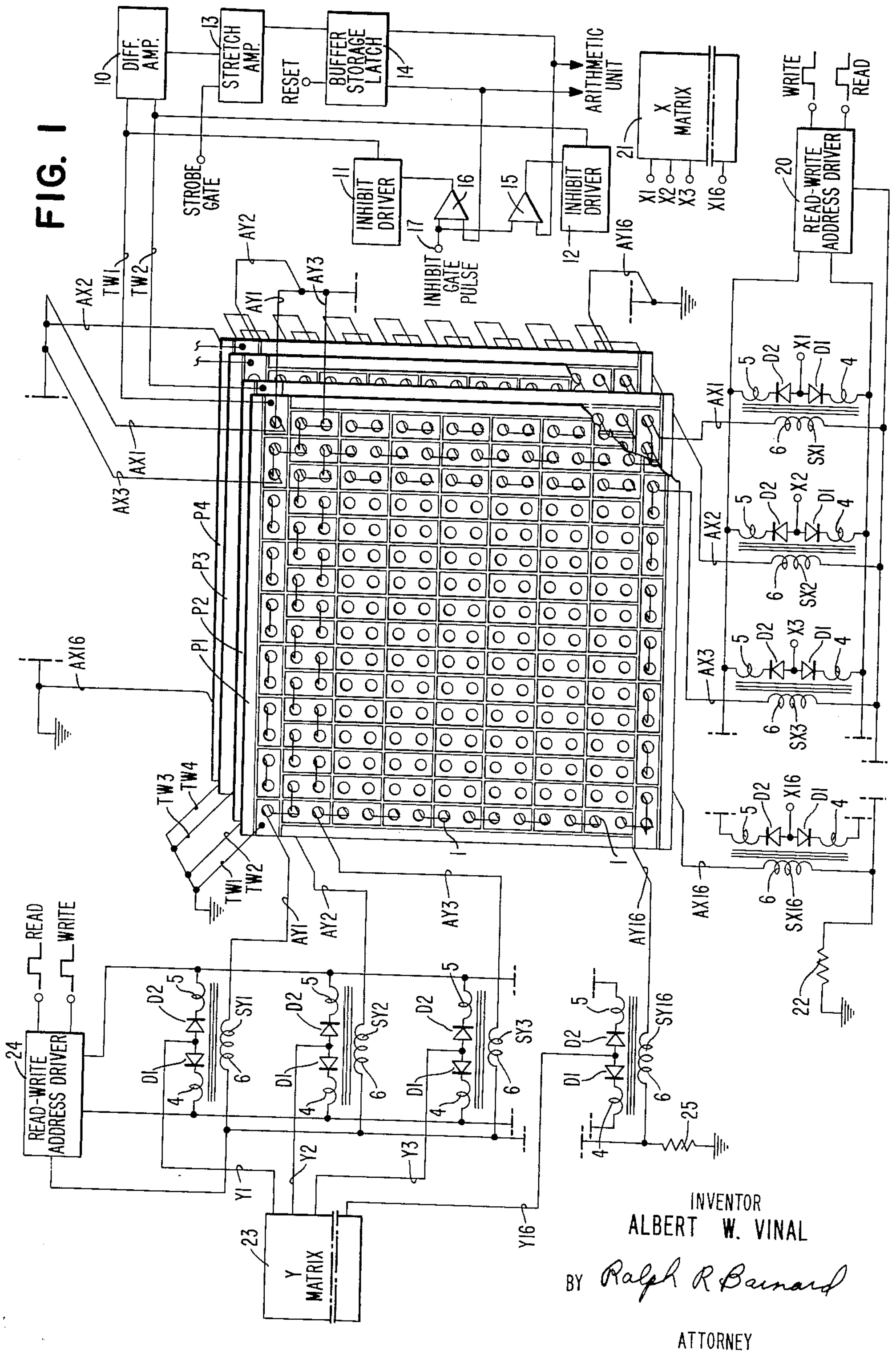
FIG. 1 shows an over-all schematic of an electrical addressing system according to the present invention as applied to the ferrite apertured plate memory.

Referring to FIG. 1 generally, novelty is considered to reside in providing a separate transformer switch SX1, SX2, etc. for each of the address conductors AX1, AX2, etc. along one coordinate (X) and connecting them in parallel so that each may cooperate with one read-write driver 20. In order that only one transformer SX and its corresponding address conductor AX are connected to the read-write driver 20 at one time, an X-matrix 21 is used for selectively energizing terminals X1, X2, etc., thereby forward biasing the appropriate switching diodes D1 and D2 and connecting said read-write driver 20 to a particular transformer switch and corresponding address conductor.

In addition, a sampling resistor 22 is connected in series with a parallel combination of all the address conductors AX so that each of the current address pulses pass therethrough for the purpose of sampling the instantaneous current flow. The voltage derived across this sampling resistor is then fed back to the input of the read-write driver so as to control the amplitude of the current address pulse to a high degree of accuracy, regardless of a change in environmental operating conditions or a certain amount of change in the operating parameters of the circuit for other reasons. Moreover, because the read-write driver 20 is of the feedback type, it is easier to satisfy the operational requirement that the read current address pulses be of the opposite polarity with that of the write current address pulses when the address conductor and related circuitry is inductive.

While FIG. 1 shows a ferrite apertured plate memory, it is emphasized that the addressing system of the present invention also has application to other types of memory units requiring address pulses having amplitudes which have to be controlled to a high degree of accuracy by reason of changes in the environmental operating conditions and the operating parameters of circuit components.

Referring to the details of FIG. 1, there is shown a portion of an exemplary ferrite apertured plate memory comprising, by way of example, four ferrite apertured plates P1, P2, P3 and P4. In the embodiment of the present invention being described, these plates cooperatively operate in pairs P1—P2 and P3—P4 to define the first and second bits of a word of binary information. If it is desired to use additional bits to define a word, additional plate pairs (not shown) may be incorporated. Each of these plates P1, P2, etc. comprises individual memory units or discrete cells of ferrite integrally formed into one solid plate with each ferrite cell having an aperture 1. Each of the ferrite cells of a particular plate is used to partially define a binary bit of a separate word of binary information. The binary word storage capacity of the ferrite apertured plate is then determined by the number of ferrite apertured cells contained within that plate.

Because of the nature of the plural ferrite cells surrounding each of the apertures 1, they are magnetically similar to the toroidal core of the prior art and may be analyzed in terms of the hysteresis loop shown in FIG. 2. Therein, two reproducible magnetic conditions are selected to correspond with the + and − remanent conditions of the hysteresis loop. Following the application of a sufficiently large + magnetomotive force H to either a ferrite toroidal core or a ferrite apertured cell, it is placed in the + magnetic remanent condition shown in FIG. 2. Likewise, following the application of a sufficiently large − magnetomotive force H to a ferrite toroidal core or a ferrite apertured cell, it is placed in the − magnetic remanent condition shown in FIG. 2.

In the prior art toroidal core memory system, one of these magnetic conditions represented one binary condition, and the other magnetic remanent condition represented the other binary condition. Moreover, during the writing and reading cycle, each toroidal core was changed from one magnetic remanent condition to the other, as desired, by the application of a magnetomotive force of the proper polarity and magnitude by coincident current pulses within the X and Y coordinate address wires passing through the hole of the toroidal core. However, if only one of the address conductors passing through a toroidal core received a current pulse, thereby producing a magnetomotive force of the proper polarity, its magnetic condition returned to its initial remanent condition after the application of the single coordinate address pulse.

Similarly, each aperture 1 of plates P1, P2, P3 and P4 of FIG. 1 has both an AX address conductor and an AY address conductor passing therethrough. In addition, each plate P1, P2, etc. has a third winding of conductive material plated on top of the ferrite cells in a manner so that it is the effective equivalent of threading a winding in series through each of the apertures 1 of a plate. The physical detail of the winding is described in the RCA publication referred to above. As will be described in more detail hereinafter, the third winding may be utilized to provide an inhibit function during the write cycle or a readout sensing function during the read cycle.

Referring again to FIG. 1, each of the AX address conductors are passed through all of the ferrite apertures 1 having the same X-coordinate. Since the apertures of plates P1, P2, etc. having identical coordinates are in physical registry, the address conductor is passed directly through all of those apertures before being threaded through the vertically adjacent apertures having the same identical X-coordinate. Specifically, address conductor AX1 is passed directly through the aperture 1 in the lower righthand corner of plates P1, P2, P3 and P4 from front to back and then passed back through the vertically adjacent aperture 1 of plates P1, P2, P3 and P4 having an identical X-coordinate from back to front. Following the same pattern, address conductor AX1 is then passed through all of the other adjacent apertures 1 of plates P1, P2, P3 and P4, etc. until all of the apertures 1 having an identical X-coordinate have the address conductor passing therethrough. One end of the address conductor AX1 is then connected directly to ground in parallel with all of the other AX address conductors, as shown. Similar to the AX1 address conductor, the AX2 address conductor is passed directly through the next horizontally adjacent aperture 1 in the lower righthand corner of plates P1, P2, P3 and P4 and then passed back through the next vertically adjacent aperture 1 of those plates having an identical X-coordinate.

It should be noted that address conductor AX2 is initially passed from the back of the plates to the front of the plates, as distinguished from the vice versa arrangement for address conductor AX1. The reason for this requrement is that the third winding printed on each of the ferrite plates is the effective equivalent of threading a winding in series with each of the apertures 1 of a whole plate, thereby effectively passing the winding through each of the adjacent apertures 1 in a different direction. Since it is desired that a current pulse of the same polarity acting on each of the address windings AX1 and AX2 has the same effect on the respective apertured cells, the reversal of the alternate address windings becomes necessary. For this same reason, address conductor AX3 initially passes from the front of plates P1, P2, P3 and P4, etc. to the back in the same manner as address conductor AX1. To avoid unnecessary circuit complication, in FIG. 1 address conductors AX4 through AX15 are not shown therein.

Similar to the X-coordinate address conductors, exemplary Y-coordinate address conductors are shown passing through the apertures 1 of each plate which are in registry and which have the same Y-coordinate. For example, address conductor AY1 is shown passing through the apertures in the upper left hand corner of plates P1, P2, P3 and P4 from front to back and then passes through the next horizontally adjacent apertures having the same Y-coordinate from back to front, etc. Likewise, address conductor AY2 passes through the next vertically adjacent apertures 1 of plates P1, P2, P3 and P4 which are in registry from back to front, etc., and address conductor AY3 passes through the next vertically adjacent apertures 1 of plates P1, P2, P3 and P4, which are in registry from front to back, etc., in a manner similar to that shown for address conductor AY1. To avoid unnecessary circuit complications in FIG. 1, address conductors AY4 through AY15 are not shown therein. However, AY16 is shown threaded in a manner similar to address conductor AY2. As described herein above in reference to the AX address conductors, one terminal of each of the AY address windings is connected directly to ground in parallel with all of the other AY address conductors.

According to the addressing technique of the prior art as described thus far, when it is desired to read out the binary information which may be stored in the ferrite cell around aperture 1 in the upper righthand corner of plates P1 through P4, coincident current pulses are applied through address conductors AY1 and AX1 so as to provide the necessary magnitude of magnetomotive force to cause the magnetic condition of the ferrite cell to change from a + remanent condition a − remanent condition, or vice versa, depending upon the polarity of the address currents and the nature of the binary information stored therein. If there is a change of magnetic condition from one remanent condition to the other, as represented by the hysteresis loop of FIG. 2, this flux change induces a voltage in the third winding of each plate which is representative of the stored binary condition being read out. While the apertures 1 in the upper righthand corner of each plate receives a magnetomotive force H of sufficient magnitude to change the magnetic condition of the ferrite cell, this is not true of the other ferrite cells having only the AX1 coordinate or the AY1 coordinate, since only half of the magnetomotive force which is necessary to change the magnetic condition of the cell is available. While the magnetic condition of these ferrite cells is not changed by the address currents, each cell experiences a flux change therein prior to the magnetic condition of that cell returning to its initial remanent condition. This results in a voltage being induced in the third winding by each of these half-addressed ferrite cells which will be described hereinafter as half-select noise voltage. Inasmuch as the third winding for each plate is passed in series through the apertures 1 of each of these cells within each plate, the half-select voltages generated and each half-address cell are additive, and a very large total half-select voltage is induced in the third winding of each plate.

For example, considering plate P1 which has 16 ferrite cells along each coordinate, 15 ferrite cells along the X-coordinate are half-addressed and 15 ferrite cells along the Y-coordinate are half addressed with only one ferrite cell being coincidentally addressed such that it may produce a readout induced voltage commensurate with the flux change between its + and − remanent conditions. As one skilled in the art will recognize, the half-select induced voltages are likely to be many times greater than the desired readout signal, thereby rendering the induced voltage commensurate with the binary condition readout unrecognizable. In order to overcome this shortcoming, the prior art, as set forth in the RCA publication identified hereinabove, teaches the use of two ferrite plates as a pair with the third windings exemplified by TW1 and TW2 of plates P1 and P2, respectively, connected in an electrically opposed relationship so that the half-select voltages induced in one cancels the half-select voltages induced in the other with the smaller readout induced voltages remaining. In FIG. 1, one terminal of third windings TW1 and TW2 is commoned and connected to ground, while the other terminal of each is connected to a differential amplifier 10 which will derive an output voltage commensurate with the instantaneous difference between the voltages induced in each of these third windings. This output voltage from differential amplifier 10 will be commensurate with the binary condition which had been stored in the addressed ferrite apertured cell. Differential amplifier 10 may be one of several known types or of a construction as one described in copending application Ser. No. 745,630, filed June 30, 1958, entitled "Common Mode Feedback Circuits," Richard W. Jones, inventor, and assigned to the same assignee as the present application.

Under these conditions, both ferrite apertured plates P1 and P2 may be utilized to define the binary conditions representing a "0" and a "1" which it is desired to store in the memory. One representative method of defining these binary conditions is shown in FIGS. 3*a* and 3*b*. FIG. 3*a* shows two hysteresis loops, similar to that described in Fig. 2, representing the magnetic conditions of ferrite apertured cells having identical AX and AY coordinates on plates P1 and P2 when the pair is storing a "0." Therein, a "0" is stored when the corresponding ferrite apertured cell of plate P1 is in its + remanent condition, while the corresponding ferrite apertured cell of plate P2 is in its − remanent condition.

FIG. 3*b* shows two hysteresis loops, similar to that described in FIG. 2, representing the magnetic conditions of ferrite apertured cells having identical AX and AY coordinates on plates P1 and P2 when the pair is storing a "1." Therein, a "1" is stored when the corresponding ferrite apertured cell of plate P1 is at its − remanent condition, while the corresponding ferrite apertured cell of plate P2 is at its + remanent condition.

Based on the method of defining the binary conditions set forth in FIGS. 3*a* and 3*b*, each ferrite apertured cell of a pair has an initial magnetic condition of being at + remanence on its hysteresis loop prior to the insertion of binary information into storage. Assuming this mode of operation, FIG. 4*a* symbolically illustrates the writing of a "1" into storage; FIG. 4*b* symbolically illustrates the writing of a "0" into storage; FIG. 4*c* symbolically illustrates the reading of a "0" out of storage; and FIG. 4*d* symbolically illustrates the reading of a "1" out of storage.

Considering, by way of example, that it is desired to write a "1" into the ferrite apertured cell pair at the upper righthand corner of plates P1 and P2, FIG. 4*a* shows a hysteresis loop for each ferrite cell of the pair (identified as P1 and P2) representing both the initial magnetic conditions and the final magnetic conditions. In FIG. 4*a*, it should be noted that both the ferrite apertured cells of P1 and P2 are initially in the + remanent condition. However, when each of the ferrite apertured cells is coincidentally addressed by passing the negative going current pulses IAX1 and IAY1, depicted in FIG. 4*a*, through address conductors AX1 and AY1, respectively, each of the addressed ferrite apertured cells P1 and P2 receives two magnetomotive forces represented by vectors HAX1 and HAY1, each having half the magnitude necessary to drive the ferrite apertured cells P1 and P2 to their − remanent conditions. Thus, the coincident address pulses would act to change the magnetic condition of both of the selected cells P1 and P2, except for the fact that when it is desired to write a "1" in the selected cell pair, the third winding TW2 of plate P2 is also pulsed by an inhibit driver 12, which will be described in more detail hereinafter. Meanwhile, the third winding TW1 of plate P1 is not pulsed. In FIG. 4*a*, this inhibit current pulse is identified as ITW2 and has a polarity which is opposite to the coincident address pulses so as to generate a magnetomotive force HTW3, which is equal and opposite to either HAX1 or HAY1, such that the net magnetomotive force acting on the selected cell of P2 will not change its magnetic condition. However, nothing prevents the selected cell of P1 from going to its − remanent condition, thereby putting the selected pair of cells in a condition to define a binary "1" in the manner described above in FIG. 3*a*. It should be noted that the final condition illustrated in FIG. 4*a* is the same as that shown in FIG. 3*b*.

Similarly, when it is desired to write a "0" into the ferrite apertured cell pair at the upper righthand corner of plates P1 and P2, FIG. 4*b* shows a hysteresis loop for each ferrite cell of the pair representing both the initial and final magnetic conditions. As in FIG. 4*a*, both of the ferrite cells of P1 and P2, represented in FIG. 4*b*, are initially in the + remanent condition. However, when each of the ferrite apertured cells is coincidentally addressed by negative going current pulses, IAX1 and IAY1, two forces represented by vectors HAX1 and HAY1 are supplied to drive the ferrite apertured cells P1 and P2, having sufficient total magnitude to drive each cell to its − remanent condition. However, if the third winding TW1 of plate P1 is also pulsed by an inhibit driver 11, which will be described in more detail hereinafter, a magnetomotive force HT1 is produced which is equal and opposite to either HAX1 or HAY1 acting on the selected cell of P1 so that it will not change its magnetic condition. On the other hand, the addressing magnetomotive forces HAX1 and HAY1 will be sufficient to drive the selected ferrite apertured cell of P2 to its − remanent condition, and the final condition of the cell pair shown in FIG. 4*b* will be identical with FIG. 3*a*.

When it is desired to read the binary information stored in the ferrite apertured plate memory, the appropriate ferrite apertured cell of each plate is selected by coincident current pulses in the same manner as during the writing operation, except that the current pulses have an opposite polarity. By way of example, consider that the ferrite apertured cell pair at the upper righthand corner of plates P1 and P2 is storing a "1" and it is desired to read this "1" out. FIG. 4*c* shows a hysteresis loop for each ferrite cell of the pair (P1 and P2) having an initial magnetic condition corresponding to a binary "1" with the selected cell in plate P1 being in its − remanent condition and the corresponding cell in plate P2 being in its + remanent condition. It should be noted that this initial condition corresponds to FIG. 3*b*.

However, when each of the selected cell pairs is coincidentally addressed by passing the positive going pulses IAX1 and IAY1, as depicted in FIG. 4*c*, through address conductors AX1 and AY1, respectively (FIG. 1), each of the selected cells receives two magnetomotive forces represented by vectors HAX1 and HAY1. Each of these two magnetomotive forces has half the magnitude necessary to drive the selected ferrite apertured cells of P1 and P2 from their − remanent condition to a + remanent condition. However, since the selected cell of P2 is already in its + remanent condition, only the selected cell of P1 is driven to a + remanent condition, as illustrated by the pair of hysteresis loops corresponding to the final condition. It should be noted that this portion of FIG. 4*c* corresponds to the initial condition shown in FIGS. 4*a* and 4*b*.

On the other hand, when the ferrite apertured cell pair at the upper righthand corner of plates P1 and P2 has a magnetic condition corresponding to storing a binary "0," as represented by the initial condition of the two hysteresis loops of FIG. 4*d*, this information may be read out by coincidentally passing the positive going current pulses IAX1 and IAY1, depicted in FIG. 4*d*, through address conductors AX1 and AY1, respectively (FIG. 1). As a result of these address current pulses, both of the selected cells of plates P1 and P2 receive two magnetomotive forces represented by unit vectors HAX1 and HAY1, each having half the magnitude necessary to drive the selected cells of P1 and P2 to their − remanent condition. However, since the selected cell of P1 is already in a + remanent condition, the coincident address pulse is effective only to drive the selected cell of plate P2 to the + remanent condition. This portion of FIG. 4*d* corresponds to the initial condition shown in FIGS. 4*a* and 4*b*.

During the readout operation, as described hereinabove, it is the voltages induced in the third winding which are detected and analyzed to determine the binary condition which had been in storage. For example, referring to FIG. 4*c*, there is an illustration of the positive going voltage pulse induced into the third winding TW1 of plate P1 by the change of the selected cell in plate P1 from its − remanent condition to its + remanent condition. On the other hand, since the remanent magnetic condition of P2 has not been changed, there is no corresponding voltage induced into the third winding TW2 of plate P2. However, there are other voltages induced into windings TW1 and TW2. One other source of induced voltage in windings TW1 and TW2 is the flux changes resulting in half-addressing within each plate of all of the ferrite apertured cells having one of its coordinates identical with the selected cell. Using the example used hereinabove when the apertured cell in the upper righthand corner of each plate in the memory is addressed, all of the cells having a coordinate either that of AX1 or that of AY1 will be half-addressed, and a voltage will be induced in the third winding of each plate in accordance with the sum. As has been indicated hereinabove, because third windings TW1 and TW2 of plates P1 and P2 are connected to electrically oppose each other in the input of differential amplifier 10, the voltages due to the half-addressing within plates P1 and P2 cancel each other within the differential amplifier.

Thus, when two plates are used to cooperatively define and store a binary bit of information within a coordinate addressing scheme and provide a noise-free readout, additional plate pairs may be utilized to define and store additional binary bits of information in parallel therewith, as shown by plates P3 and P4. Thus 12 pairs, or 24 plates, may be used to define and store a binary word having 12 bits. etc. Under such an arrangement, each pair of plates would have a separate read and inhibit instrumentation of the general type shown associated with plates P1 and P2 in FIG. 1.

During the readout operation, if a "1" had been stored in the coincidentally addressed ferrite apertured cell, a positive going pulse, similar to that shown in FIG. 4*c*, is induced in third winding TW1 of plate P1 and passed through differential amplifier 10. On the other hand, if a "0" is stored in the coincidentally addressed ferrite apertured cell, a positive voltage pulse is induced in third winding TW2 of plate P2, as shown in FIG. 4*d*, and passed through differential amplifier 10. One method of using this readout binary information is to convert the positive voltage pulse read out of TW1 of plate P, representing a "1," to a positive computer logic pulse of a specific pulse width and amplitude and provide means for representing the "0" binary condition as the reference voltage level. Moreover, notwithstanding the half-select noise voltage cancellation obtained, as described hereinabove, the leading edge of these readout voltage pulses may contain large amplitude noise. Therefore, means must be provided to select only the desired voltage pulse and derive a positive computer logic pulse to represent a binary "1" condition. Such means may be one of several types exemplified by a stretch amplifier 13, the details of which are described in copending application Ser. No. 757,803, filed August 28, 1958, entitled "Electronic Detection and Amplification Means," A. W. Vinal, inventor, and assigned to the same assignee as the present application. Since the circuit details of this stretch amplifier are not a part of the present invention, it will not be described herein in detail.

The positive going logic pulse derived in the output of the stretch amplifier 13, in response to the reading out of a binary "1" condition, is applied to the 1 input terminal of buffer storage latch 14. Latch 14 is of conventional construction with the two input terminals labelled 1 and 0 and two output terminals labelled 1 and 0. A latch conventionally has two operational states: a rest condition and a set condition. Considering positive logic, a latch originally in the reset condition will drive its 1 output terminal from a reference voltage level in a positive direction to an up level in response to a positive voltage pulse input to its 1 input terminal. Correspondingly, the 0 output terminal of the latch goes to the reference voltage level (down voltage level). The latch is then in what is defined as its set condition. Moreover, the conventional latch circuit may be driven back to its reset condition only by the application of a positive voltage pulse to its 0 input terminal so that the 0 output terminal goes to an up voltage level and the 1 output terminal goes to the reference voltage level (down voltage level). It is emphasized that when the 1 output terminal is at an up voltage level, the 0 output terminal must be in its down voltage level and vice versa. Accordingly, as a result of the application of a positive going pulse to latch 14, representing a binary "1" condition, its 1 output goes to an up voltage level. However, if a binary "0" is read out of the coincidentally addressed ferrite apertured cell, the reset condition of latch 14 is not changed.

Whether latch 14 is placed in its set condition or remains in its reset condition, it stays in that condition during the remainder of the read and write cycle of operation with the output of the latch being available as an input to the arithmetic unit, as shown, representing one binary bit of a word of binary information. During the write operation, the 1 output terminal of latch 14 is utilized to initiate the inhibit pulse (described hereinabove in connection with FIG. 4*a*) in a third winding TW2 of plate P2 through AND gate 15 and inhibit driver 12. Similarly, during the write operation, the 0 output terminal of latch 14 is utilized to initiate the inhibit pulse (described hereinabove in connection with FIG. 4*b*) in third winding TW1 of plate P1 through AND gate 16 and inhibit driver 11. On the application of an up level of voltage to terminal 17, representing an inhibit gating pulse, during the write operation, either AND circuit 16 or AND circuit 15 will be coincidentally receiving an up level from latch 14 in accordance with whether a binary "1" condition or a binary "0" condition is stored therein. When AND circuit 16 is receiving two up voltage levels, inhibit driver 11 will be initiated. When AND circuit 15 is receiving two up voltage levels, inhibit driver 12 will be initiated. Since the amplitude of the inhibit current pulses derived by these two drivers is not as difficult to control (i.e., does not have to be switched from one polarity to another) as the address current pulses referred to hereinabove, the inhibit driver may be of conventional circuitry exemplified by a transistorized emitter-follower driving a transformer switch connected in a common emitter configuration between cutoff and saturation. Alternatively, the inhibit drivers may be of the feed-back type similar to either the read or write drivers which will be described hereinafter in connection with FIG. 5. The inhibit gating pulse appropriately applied to terminal 17 of the conventional positive logic AND circuits may be obtained by conventional techniques.

Much of the ferrite apertured plate memory system, as described thus far in connection with FIGS. 1, 2, 3*a*, 4*a*, 4*b*, 4*c* and 4*d* is illustrative of the teachings set forth in the RCA publication identified hereinabove and is similar in many respects to the toroidal core memory systems also of the prior art. However, the address instrumentation of the ferrite apertured plate memory raises design considerations not necessarily present in the toroidal core memory. One of these design considerations is that the ferrite apertured cells do not have the same degree of squareness in their hysteresis loop as do the toroidal cores. The basic reason for this is that the radial gradation of flux density of the ferrite cells around the aperture is higher than that of the toroidal cores, and the ratio of outside diameter to inside diameter of the effective core area is not as well defined as that for toroidal cores. Not only is there a lack of squareness in the hysteresis loop of the ferrite apertured cell as compared with the toroidal core, but the degree of squareness will vary somewhat from one ferrite apertured cell to another within the same plate. As a result, the amplitude of the address current pulses, which will be sufficient to drive the ferrite apertured cells from one polarity of magnetic remanence to the other, is more critical and has to be controlled to a high degree of accuracy. Otherwise, the reliability with which a binary condition is written into or read out of a ferrite apertured cell will decrease because of the possibility of irregular switching of the cells from one remanent condition to the other. Not only do the address pulses applied to a particular address conductor have to be controlled as to amplitude to a high degree of accuracy, but the address current pulses to all of the address conductors along each coordinate should be at the very same level. This current pulse amplitude accuracy control problem is further complicated by the usually high frequency requirements of the memory system and by the fact that the direction or polarity of the current pulses passing through each of the inductive address conductors during the read operation and write operation is of opposite polarity.

Additional problems involved in controlling the address current pulse levels to a high degree of accuracy result from the fact that power supply voltages to the drivers producing the current pulses invariably have an uncertain amount of voltage regulation. This is particularly true in airborne systems. The design considerations of controlling the accuracy of the address current pulse levels is further complicated when it is desired to provide a memory system using entirely solid-state devices, such as transistors in an environment subject to change of ambient temperature. It should be noted that the operational parameters of transistors often vary from unit to unit and with ambient temperature variations.

Based on the considerations set forth hereinabove, the present invention teaches a technique for providing very reliable coordinate addressing by utilizing one read-write driver for all of the address windings along each coordinate and by controlling the current address pulse amplitude to a very high degree of accuracy by using a voltage feedback technique which includes the desired address conductor within the loop. Furthermore, by including a novel switching technique, only one address conductor along each coordinate is within the feedback loop at any one time.

Referring to the details of the addressing instrumentation shown in FIG. 1, a read-write driver 20 is connected to the center-tapped primary winding of transformer switches SX1, SX2, SX3 and SX16, etc. with transformer switches SX4 through SX15 not being shown for purposes of circuit simplicity. As shown, each of these transformers is connected to its corresponding address conductor AX1, AX2, etc. The center-tapped primary winding of transformer SX1 is shown as comprising steering diode D1 and winding portion 4, on one side of the center tap, and steering diode D2 and winding portion 5, on the other side of the center tap. Transformer switch SX1 also has a secondary winding 6. The other transformer switches SX2, SX3 and SX16 are composed of identical elements with the same numerical identification.

In order to select and pass a current pulse through one of the address conductors AX1 through AX16, a conventional diode or magnetic matrix 21 may be utilized to provide a supply voltage to the center tap of one of the X-coordinate transformer switches. These center taps are appropriately labeled X1 through X16 on both the transformer switches and the output side of the X-coordinate matrix 21. Thus, if it is desired to select address conductor AX1, the X1 output terminal of the X-coordinate matrix 21 is appropriately energized with a + voltage so that diodes D1 and D2 of transformer switch SX1 are forward biased, thereby acting as a very low impedance to the passage of current through the center-tapped primary winding (4 and 5). X-coordinate matrix 21 may be completely conventional in its construction and the details thereof perform no part of the present invention. Reference may be had to pages 57–60 of the textbook entitled Digital Computer Components and Circuits by R. K. Richards, first published November 1957 by D. Van Nostrand Company, Inc. Princeton, New Jersey.

When address conductor AX1 is selected by the switching action just described, either a read or write address pulse may be applied to read-write driver 20 so that a current may be passed through either read winding portion 4 or write winding portion 5 so that an appropriate current pulse is induced in the secondary 6 of transformer SX1. As has been described hereinabove, the current pulse induced in secondary winding 6 and address conductor AX1 has to have one polarity during the read operation and have the other polarity during the write operation. The details of read-write driver 20 will be described hereinbelow in connection with FIG. 5. However, in order to provide the voltage feedback necessary to control the amplitude of the current pulse during the read and write operation, the secondary winding 6 is connected in series with sampling resistance 22.

As shown in FIG. 1, the voltage across resistor 22 is fed back to the read-write drive 20. Accordingly, if it is desired to select address conductor AX2 instead of address conductor AX1, the X-coordinate matrix 21 provides a + voltage at terminal X2 instead of X1, and the center tap of transformer switch SX is energized so that steering diodes D1 and D2 of that transformer are forward biased so that read-write driver 20 is operatively connected to transformer SX2 and induces appropriate address current pulses in its secondary 6. Since sampling resistor 22 is also in series with the secondary 6 of transformer X2, it continues to provide a sampling voltage to accurately control the address current pulse amplitude during the read and write operation as before.

As in the case of the X-coordinate, the Y-coordinate address conductors AY1, AY2, AY3 and AY16, etc. may be selected by the cooperative action of a Y-coordinate matrix 23 and corresponding transformer switches SY1, SY2, SY3 and SY16. For circuit simplification, transformer switches SY4 through SY15 are not shown. Each of the Y-coordinate transformer switches are of identical construction with the center-tapped primary winding comprising winding portions 4 and 5, steering diodes D1 and D2, and a secondary identified as winding 6. If it is desired to select address conductor AY1, Y-coordinate matrix 23 acts in a conventional manner to apply a + voltage to the center tap Y1 of transformer switch SY1. This voltage forward biases steering diodes D1 and D2 so that read-write driver 24 may pass a pulse through portion 4 of the primary winding of transformer switch SY1 to induce a current pulse in secondary 6, having one polarity during the read operation, or pass a current pulse through portion 5 of the primary to induce a current pulse in the secondary 6, having the other polarity during the write operation.

In order that read-write driver 24 accurately control these pulse amplitudes, the address current passing through secondary 6 also provides a sampling voltage across resistor 25 which may be fed back to read-write driver 24. Sampling resistor 25 is connected to a parallel combination of all of the secondaries of the Y-coordinate transformer switches SY1, SY2, etc., However, since only one of these transformer switches is selected by Y-coordinate matrix 23 at any one time, sampling resistor 25 is effectively in series with only one secondary winding 6 at a time. When the steering diodes of transformer switch SY1 are forward biased, none of the steering diodes in the other transformer switches are forward biased. Any of the other Y-coordinate address conductors may be selected and provided with an address current pulse in exactly the same manner as address conductor AY1. The Y-coordinate matrix may be of conventional construction, as exemplified by that shown in textbook entitled Digital Computer Components and Circuits further identified hereinabove. The circuit details of read-write driver 24 are substantially identical with X-read-write driver 20, which will be described in more detail hereinafter in connection with FIG. 5.

Thus, according to the present invention, each of the X-coordinate transformer switches SX1, SX2, etc. and the corresponding address conductors AX1, AX2, etc. selectively coact with a single read-write driver 20. Moreover, this single read-write driver 20 acts by way of a feedback technique to accurately maintain the amplitude of the address pulses derived by the read-write driver 20 at the same level regardless of which X-coordinate address conductor and corresponding transformer switch is selectively connected thereto. Although the voltage supplied by the X-coordinate matrix 21 selects which transformer switch is operatively connected to the read-write driver 20, it also acts to provide a supply voltage to the final stage of that read-write driver. That this is true will become apparent in the detailed description of FIG. 5 set forth hereinbelow.

Likewise according to the present invention, each of the Y-coordinate transformer switches SY1, SY2, etc. and corresponding address conductors AX1, AX2, etc. selectively coact with a single read-write driver 21. In addition, this single read-write driver 21 acts by way of a feedback technique to accurately maintain the amplitude of the current address pulses derived by the read-write driver 21 at the same level regardless of which Y-coordinate address conductor and corresponding transformer switch is selectively connected thereto. Similar to the action of the X-coordinate matrix 21, the Y-coordinate matrix 23 selects which transformer is operatively connected to the read-write driver 21, and it also provides the supply voltage to the final stage of the read-write driver 21.

When solid-state or transistor read-write drivers are used in conventional memory systems, such as the toroidal core type described hereinabove, the driver transistors operate as switches which are deliberately saturated during the closed condition by over-driving the base-to-emitter junction and operated cutoff during the open condition. Moreover, the amplitude of the collector current during the saturation condition is chosen so as to correspond with the desired amplitude of the address current. The amplitude of the current pulse during the saturation condition is determined by the collector supply voltage, the saturation resistance of the transistor, and the collector load resistance. Moreover, if the address conductor has inductance, and it always does, the rise time of the current address pulse is determined by the collector load resistance and the inductance of the address conductor.

As indicated hereinabove, it is desired that the instrumentation of a memory system, according to the present invention, provide address current pulses having an amplitude which is relatively independent of the driver power supply voltage and the saturation resistance of the switching transistor because of the limitations this places on the system. In addition, it is desired that the read-write instrumentation of a memory system be relatively independent of variations of current gain and relatively high switching capacities in transistors used therein. These desirable features are obtained, according to the present invention, by utilizing a single feedback read-write driver for each coordinate of the ferrite memory system incorporating a novel switching arrangement to operatively connect that driver to any of the address conductors along that coordinate.

Referring now to FIG. 5, the circuit details are shown of a read-write driver, according to the present invention. Therein, NPN–PNP transistor pairs T1—T2, T3—T4, T5—T6 and T7—T8 cooperate as complementary emitter-followers, while NPN transistors T9 and T10 provide power to the selected address conductor through a transistor switch which has been selected by the coordinate matrix switch. As is conventional, each of the transistors has a collector, an emitter and a base element. Although read-write drivers 20 and 24 are substantially identical, the circuitry of FIG. 5 is shown for purposes of an example as being that of the X-read-write driver 20 connected only to the address conductor AX1 and transformer switch SX1 by the application of a + voltage terminal X1 by X-coordinate matrix 21. Besides forward biasing the steering diodes D1 and D2, the + voltage being supplied by the X-coordinate matrix 21 is selected to have a sufficient magnitude to provide the collector voltage supply $V_{cc}$ of drivers T10 and T9.

Center-tapped transformer switch SX1 is necessary in this system in that the current address pulses in secondary 6 and the address conductor AX1 are required to have one polarity during the read operation and the other polarity during the write operation. Thus, a current pulse being derived during the read operation in transistor T10 and winding portion 4 will have a direction indicated by the arrow shown, and a current pulse being derived during the write operation in transistor T9 and winding portion 5 will have a direction indicated by the oppositely oriented arrow shown in order to provide the necessary current reversal in secondary 6 of the selected transformer switch SX1 and the selected address conductor AX1.

During read time, a positive read logic pulse R is A.C. coupled through capacitor 23 to the base elements of transistors T1 and T2 acting as a complementary emitter-follower. The source of the read logic pulse R may be conventional. As shown, the base input of transistors T1 and T2 is clamped by diode D4 to a temperature compensation voltage line 26 having a function and operation which will be described in detail hereinafter. Because the read logic pulse R forward biases the base-to-emitter junction of both transistors T1 and T2, the complementary emitter-follower acts to derive an identical read logic pulse (with power gain) on the commoned emitter elements thereof for application through summing resistor 24 to the base elements of transistors T3 and T4 also connected as a complementary emitter-follower.

In order to provide the voltage feedback referred to hereinabove for accurately controlling the amplitude of the current address pulses being derived, resistor 24 forms a summation network with a feedback resistor 25. As shown, the voltage being applied to this network via resistor 25 is commensurate with the voltage drop across sampling resistor 22 as a result of the instantaneous current address pulse passing through the secondary winding 6 of the selected transformer switch SX1, the sampling resistor 22 and the selected address conductor AX1. Since the voltage developed across sampling resistor 22 is subtracted from the voltage being applied to summing resistor 24, this may be classified as negative feedback with the algebraic sum of the voltage being applied to the bases of transistors T3 and T4. When this voltage is sufficient to forward bias the base-to-emitter junction, a similar voltage in the form of a positive pulse is applied to the base of driver transistor T10 (with power gain).

Driver transistor T10 in turn has its base-to-emitter junction forward biased by this pulse so as to apply an addressing current pulse to winding portion 4 of the primary winding of the selected transformer SX1, thereby inducing a current address pulse in the selected address conductor AX1 having a first polarity which may, for example, correspond to the current address pulses shown in FIGS. 4*c* and 4*d*.

Likewise, during write time, a positive read logic pulse W is A.C. coupled through capacitor 30 to the base elements of transistors T5 and T6 acting as a complementary emitter-follower. The source of the write logic pulse W may be conventional. As shown, the base input of transistors T5 and T6 is clamped by diode D4 to the temperature compensation voltage line 26 having a function and operation which will be described in detail hereinafter. Because the write logic pulse W forward biases the base-to-emitter junction of both transistors T5 and T6, the complementary emitter-follower acts to derive an identical write logic pulse (with power gain) on the commoned emitter elements thereof for application through summing resistor 31 to the base elements of transistors T7 and T8 also connected as a complementary emitter-follower.

In order to provide the voltage feedback referred to hereinabove for accurately controlling the amplitude of the current address pulses being derived, resistor 31 forms a summing network with a feedback resistor 32. As shown, the voltage being applied to this network via a transformer 33 is commensurate with the voltage drop across sampling resistor 22 which is in turn a function of the instantaneous write current address pulse passing through the secondary winding 6 of the selected transformer switch SX1, the sampling resistor 22 and the selected address conductor AX1.

Since the voltage developed across sampling resistor 22 is of a polarity to be subtracted from the voltage being applied to summing resistor 32, a negative feedback is obtained with the algebraic sum of the voltage being applied to the base elements of transistors T7 and T4. When this voltage is sufficient to forward bias the base-to-emitter junction, a similar voltage in the form of a positive pulse is applied to the base of transistor T9 (with power gain). When driver transistor T9 has its base-to-emitter junction forward biased by this pulse, an address current pulse is derived in its address circuit through load resistor 34 and portion 4 of the primary winding of the selected transformer SX1. This current address pulse in turn induces a similar current address pulse in the secondary winding 6 of the selected transformer switch SX1 and the selected address conductor AX1, which, for example, may correspond to the negative going write address pulses shown in FIGS. 4*a* and 4*b*. The circuit operation would be substantially identical had any of the other X or Y coordinate transformer switches SX or SY and address conductors AX and AY been selected.

As described hereinabove, both the read and write portions of FIG. 5 function in a negative feedback fashion during the read and write operations. By using this feedback technique, the amplitude of the address current pulse is effectively made a function only of the ratio of the amplitude of the read or write logic pulses (R or W) and the sampling resistor 22 times the ratio of the feedback resistance (25 or 32) over the summing resistance (24 or 31). As a result, the read and write current address pulses have an amplitude which is independent of the collector voltage being applied to transistors T9 or T10 variations of the current gain of any of the transistors used in the circuit of FIG. 5, whether caused by ambient temperature changes or through usage, and the inductance of the transformer switches and direct address conductors. It should be noted that the magnitude of the feedback summing and sampling resistances may be selected and maintained to a high degree of accuracy and that the amplitude of the read and write logic pulses (R and W) may also be controlled to a high degree of accuracy.

During the read operation, the voltage drop across the sampling resistance 22 is prevented from being applied to the write feedback resistor 32 by diode D5 which is oriented to be back biased by the feedback voltage across the sampling resistance 22 (the read address current pulse has a polarity which is opposite to the write address pulse). On the other hand, during the write operation, a write blanking gate is applied to the collector of transistor T3 in the read portion of FIG. 5 for the purpose of preventing the write feedback voltage derived across sampling resistor 22 from being transmitted through the emitter-follower formed by transistors T3 and T4. The write blanking gate technique utilizes the non-linear property of the base-collector junction of T3. On the application of the write blanking gate, the collector T3 is driven from its collector supply voltage V*cc* to ground, thus closing the base-collector junction of transistor T3 to any voltage present at the junction of summing resistance 24 and feedback resistance 25. In both of these instances, if the write feedback were not prevented from acting on the read portion and vice versa, the net address current generated in the address conductor would be essentially zero since one portion of the center-tapped primary winding of the selected transformer would tend to derive a current pulse which would tend to cancel the current pulse derived by the other.

While two methods described herein for preventing the write voltage feedback from affecting the read portions of the circuit of FIG. 5 and the read feedback voltage from affecting the write portions of that circuit, either type could have been used in both cases. However, as a practical matter, the blanking pulse technique is more effective in reducing the problems inherent in having an inductive load (transformers and address conductors) within the feedback loops. Therefore, it has been used in the above circuit in connection with decreasing the effect of the write operation on the read portions because the time available for deriving the write address current pulse shortly after the read operation is much less than the time available before the next read-write operation commences.

Referring again to FIG. 5, the collectors of transistors T2, T4, T6 and T8 are connected to ground through a common biasing resistor 42 in parallel with an A.C. decoupling capacitor 35 in a conventional manner. In addition, the input base elements of the complementary emitter-follower formed by T1 and T2 is connected to a — base biasing voltage V*bb* through a collector-to-base leakage current bypassing resistor 36 along one path and a clamping diode D6 and biasing resistor 37 along another path. Likewise, the input base elements of the complementary emitter-follower formed by T5 and T6 are connected to a — base biasing voltage V*bb* through a collector-to-base leakage current bypassing resistor 38 along one path and a clamping diode D4 and biasing resistor 39 along another path.

This biasing arrangement has an added advantage in that while the feedback techniques employed within the read-write driver are effective to maintain accurate address current pulse amplitudes under many circuit and ambient temperature conditions. the ferrite apertured plates themselves are temperature sensitive and the optimum address current pulse amplitude level will be different for different ambient temperatures of the ferrite apertured plate memory. While it is possible to maintain the ferrite apertured plate memory within a controlled thermal environment, it is also possible to make resistors 37 and 39 temperature responsive having a function which would be effective to change the input voltage levels at which the inputs of the read and write circuits are clamped so that the read logic pulse R and the write logic pulse W are adjusted in magnitude in accordance with the desired change in the current address pulses. As set forth above, the use of the disclosed feedback technique makes the current address pulses a function of the voltage levels of the read and write logic pulses.

While the present invention has been described as being particularly beneficial in its application to ferrite apertured plate memory systems, it is emphasized that it may also be included in the addressing instrumentation of a toroidal core memory system. In general, the teachings of the present invention are applicable to those electrical systems which require the selective application of current pulses through one of several electrical conductors where it is desired to reverse the polarity of the current pulse in the same inductive conductor during successive modes of operation and at the same time control the amplitude of the current pulse to a high degree of accuracy.

The teachings of the present invention have been described herein as being utilized in a ferrite apertured plate memory where the two apertured cells per bit provide four stable conditions with which to define the digital information. It is emphasized that the definitions of the binary conditions "1" and "0" used were arbitrary, and this selection may be modified without departing from the present invention. By way of example, the digital information stored in the two apertured cells per bit memory might even be of the ternary type. Since the method of defining the digital information forms no part of the invention, the teachings thereof are not limited to practical applications in binary information storage systems.

Numerous other modifications may be made in the disclosed embodiment without departing from the spirit of the present invention. For example, while the X-matrix 21 and the Y-matrix 23 have been shown as comprising diodes, these switching devices might also have been of the magnetic type. Also, transformer 33 of FIG. 5 may be replaced by any active electrical device which provides a gain of −1. While semi-conductors have been utilized in FIG. 5, equivalent conventional electronic tubes could have been substituted therefor.

While there have been shown and described and pointed out the fundamental novel features of the invention as applied to a preferred embodiment along with several specific modifications, it will be understood that many additional omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical current control system comprising plural conductors in which it is desired to pass bidirectional current pulses, a separate transformer switch connected to each of said conductors, a bidirectional current driver electrically connected with said plural transformer switches, a switching matrix means for selectively energizing and conductively connecting said bidirectional current driver to one of said transformer switches and corresponding conductor, means for instantaneously sampling the current passing through said selected conductor, said bidirectional current driver being of the feedback type and electrically connected to said sampling means so as to control the level of said current pulse passing through the selected conductor to a high degree of accuracy, the polarity of said current pulses being opposite for successive modes of operation of said system.

2. An electrical control system comprising at least one conductor in which it is desired to pass bidirectional current pulses during successive modes of operation of said system, a transformer switch connected to each of said conductors, a bidirectional current driver, means for selectively energizing and conductively connecting said bidirectional current driver with said transformer switch and corresponding conductor, means for instantaneously sampling the current in said conductor, said bidirectional current driver being of the feedback type responsive to the level of said current pulse passing through said conductor so that its amplitude may be controlled to a high degree of accuracy, the polarity of said current pulses being opposite for successive modes of operation of said system.

3. A digital information memory system utilizing one or more coordinates for addressing memory units storing bits of digital information, plural address conductors passing serially through all of the memory units having an identical coordinate, a separate transformer switch connected to each of said address conductors, a read-write driver connected with said plural transformer switches, a switching matrix means for selectively energizing and conductively connecting said one read-write driver to a particular coordinate transformer switch and corresponding address conductor, a sampling impedance, each of said coordinate address conductors being connected to said sampling impedance so that its address current pulse will pass therethrough, said read-write driver being of the feedback type so as to sample the voltage drop across said sampling impedance and control the amplitude of the address current pulse passing through the selected address conductor to a high degree of accuracy, the polarity of said address current pulses being opposite for writing digital information in and reading digital information out of said memory system.

4. A digital information memory address system comprising two ferrite apertured plates for each digital bit of a word of information which it is desired to store in said memory, each of said apertured plates comprising a plurality of discrete ferrite cells having an aperture therein arranged to form a grid so that each aperture may be identified according to Cartesian X and Y coordinates, said apertures relating to a particular word being in physical registry and identified by Cartesian X and Y coordinates, plural X-address conductors each passing serially through all the apertures having an identical X-coordinate, plural Y-address conductors each passing serially through all the apertures having an identical Y-coordinate, a transformer switch connected to each of said X and Y address conductors and an X-read-write driver electrically connected with a parallel combination of said transformer switches connected to said X-address conductors, a Y-read-write driver electrically connected with a combination of said transformer switches connected to said Y-address conductors, an X-address matrix for selectively connecting said X-read-write driver with a particular X-address conductor by switching the corresponding transformer switch into electrical conducting relationship with said X-read-write driver, said X-read-write driver being of the feedback type so as to apply current pulses of a highly accurate known level to said selected X-address conductor and transformer switch as desired, a Y-address matrix for selectively connecting said Y-read-write driver with a particular Y-address conductor by switching the corresponding transformer switch into an electrical conductive relationship with said Y-read-write driver, said read-write driver being of the feedback type so as to apply a current pulse of a highly accurate known level to the selected X-address conductor and transformer switch as desired, the polarity of said X and Y address current pulses being opposite for writing digital information into and reading digital information out of said memory.

5. A binary information memory address system comprising two ferrite apertured plates for each binary bit of a word of information which it is desired to store in said memory, each of said apertured plates comprising a plurality of discrete ferrite cells having an aperture therein arranged to form a grid so that each aperture may be identified according to Cartesian X and Y coordinates, said apertures relating to a particular word being in physical registry and identified by Cartesian X and Y coordinates, plural X-address conductors each passing serially through all the apertures having an identical X-coordinates, plural Y-address conductors each passing serially through all the apertures having an identical Y-coordinate, a transformer switch connected to each of said X and Y address conductors and an X-read-write driver electrically connected with a parallel combination of said transformer switches connected to said X-address conductors, a Y-read-write driver electrically connected with a combination of said transformer switches connected to said Y-address conductors, an X-address matrix for selectively connecting said X-read-write driver with a particular X-address conductor by switching the corresponding transformer switch into electrical conducting relationship with said X-read-write driver, said X-read-write driver being of the feedback type so as to apply current pulses of a highly accurate known level to said selected X-address conductor and transformer switch as desired, a Y-address matrix for selectively connecting said Y-read-write driver with a particular Y-address conductor by switching the corresponding transformer switch into an electrical conductive relationship with said Y-read-write driver, said read-write driver being of the feedback type so as to apply a current pulse of a highly accurate known level to the selected X-address conductor and transformer switch as desired, the polarity of said X and Y address current pulses being opposite for writing binary information into and reading binary information out of said memory.

6. A binary information memory address system having plural X-address conductors and plural Y-address conductors passing therethrough to identify binary information written into and read out of said memory system having an addressing system comprising plural transformer switches connected to each of said X and Y conductors, an X-read-write driver electrically connected with a parallel combination of those transformer switches connected to said X-address conductors, a Y-read-write driver electrically connected with a parallel combination of those transformer switches connected to said Y-address conductors, an X-address matrix for energizing said X-read-write driver and selectively connecting it with a particular X-address conductor by switching said corresponding transformer switch to the electrical conducting relationship with said X-read-write driver, said X-read-write driver being of the feedback type so as to apply a current pulse by a highly accurate known level to the selected Y-address conductor, a Y-address matrix for energizing said Y-read-write driver and selectively connecting it with a particular Y-address conductor by switching said corresponding transformer switch to the electrical conducting relationship with said Y-read-write driver, said Y-read-write driver being of the feedback type so as to apply a current pulse by a highly accurate known level to the selected Y-address conductor, the polarity of said address currents being opposite for writing binary information in and reading binary information out of said memory system.

7. A binary information memory addressing system comprising plural inductive address conductors, a like number of plural transformer switches, each comprising a center-tapped input winding and an output winding, each of said output windings being connected to a corresponding address conductor, each portion of said center-tapped input winding including a unidirectional device electrically oriented in the same direction, one read address amplifier having a feedback circuit, one of the extremities of the input winding of each switching transformer being connected in parallel with the corresponding extremity of the input winding of all the other of said transformer switches and the output of said read address amplifier, one write address amplifier having a feedback circuit, the other extremities of the input winding of each transformer switch being connected in parallel with the corresponding extremity of the input winding of all of the transformer switches and the output of said write amplifier, a sampling resistor, one terminal of the output winding of each transformer switch being connected together and to said sampling resistor for passing induced currents therein to be applied through said sampling resistor, the voltage derived across said sampling resistor providing a feedback to said read-write amplifier, the other terminal of said output winding of each of said transformer switches being connected to said corresponding inductive address conductor, a matrix having a number of output terminals equal to the number of address conductors and transformer switches for selectively forward biasing the unidirectional devices and one of said transformer switches and energizing the read-write amplifier connected to the extremities thereof, a source of read pulses connected to be applied to the input of said read amplifier, a source of write pulses connected to be applied to the input of said write amplifier, said read amplifier inducing a current pulse of a highly accurate current level through the selected address conductor during read time in one direction, said write amplifier inducing a highly accurate current pulse in said selected address conductor during write time having the opposite polarity.

8. A read-write address amplifier comprising a transformer switch including a primary winding which is center-tapped to provide two distinct portions between its extremities, and a secondary winding; a feedback transistor read driver, said read driver having a collector connected to one extremity of said primary winding; a feedback transistor write driver, said write driver having a collector connected to the other extremity of said primary winding; a source of collector supply voltage arranged to be selectively applied to said center tap, each portion of said center-tapped primary winding including a unidirectional device, both oriented to be forward biased by said collector voltage source; an address conductor; a sampling impedance, said address conductor and sampling impedance being connected in series with said secondary winding; means for deriving and applying a read logic pulse having a first polarity to said read driver at selected times; means for deriving and applying a write logic pulse of the same polarity to said write driver at selected times not coinciding with said read logic pulses; on coincidence of said read logic pulse and application of said collector supply voltage to said read driver, a read current address pulse is supplied to said address conductor having one polarity; the magnitude of said read current address pulse being sampled across said sampling impedance and fed back to said read driver for controlling the magnitude of said pulse to a high degree of accuracy; on coincidence of said write logic pulse and the application of said collector voltage source to said write driver, a write current address pulse is applied to said address conductor having the other polarity; the magnitude of said write current address pulse being sampled across said sampling impedance and fed back to said write driver for controlling the magnitude of said pulse to a high degree of accuracy.

9. A read-write address amplifier comprising plural transformer switches each including a primary winding which is center tapped to provide two distinct portions between its extremities and a secondary winding; an address conductor connected to the secondary winding of each of said transformers; a sampling impedance connected between ground and a common terminal, each of said address conductors being connected to said common terminal; a feedback transistor read driver having a collector being connected to one extremity of said primary winding of each of said transformer switches, a feedback transistor write driver, said write driver having a collector connected to the other extremity of said primary winding of each transformer switch; a matrix having plural outputs for providing a separate source of collector voltage for each center-tapped primary winding including means for selectively applying said collector voltage to one of said center taps, each portion of each of said center-tapped primary windings including a unidirectional electrical device, both oriented to be forward biased by the selective application of said collector voltage; means for deriving and applying a read logic pulse having a first polarity to said read driver at selected times; means for deriving and applying a write logic pulse of the same polarity to said write driver at selected times not coinciding with said read logic pulses; on coincidence of said read logic pulse and the application of said collector voltage to said read driver through the primary winding of one of said transformer switches, a read current address pulse having a first polarity is applied to the address conductor connected to said selected transformer, the magnitude of said read current address pulse being sampled across said sampling impedance and fed back to said read driver for controlling the magnitude of said pulse to a high degree of accuracy; on coincidence of said write logic pulse and the application of said collector voltage to said write driver through the primary of one of said transformer switches, a write current address pulse having the other polarity is applied to the address conductor connected to said secondary winding of said selected transformer, the magnitude of said write current address pulse being sampled across said sampling impedance and fed back to said write driver for controlling the feedback of said pulse to a high degree of accuracy.

10. A read-write address amplifier, as set forth in claim 9, wherein said feedback read amplifier comprises a first and second transistor, each cooperating with the other to function as a read complementary emitter-follower; a third transistor being connected in a grounded emitter configuration responsive to said complementary emitter-follower, said third transistor receiving its collector voltage through said selected transformer switch, said read complementary emitter-follower having an input impedance and a feedback impedance connected thereto, said read pulse being applied to said input impedance, the voltage appearing across said sampling impedance being applied to said feedback impedance.

11. A read-write address amplifier, as set forth in claim 9, wherein said feedback write amplifier comprises a first and second transistor, each cooperating with the other to function as a write complementary emitter-follower; a third transistor being connected in a grounded emitter configuration responsive to said write complementary emitter-follower, said third transistor receiving its collector voltage through said selected transformer switch, said write complementary emitter-follower having an input impedance and a feedback impedance connected thereto, said write pulse being applied to said input impedance, the voltage appearing across said sampling impedance being applied to said feedback impedance.

12. A read-write address amplifier, as set forth in claim 9, wherein said feedback read amplifier comprises a first and second transistor, each cooperating with the other to function as a complementary emitter-follower, a third transistor being connected in a grounded emitter configuration responsive to said complementary emitter-follower, said third transistor receiving its collector voltage through said transformer switch, said read complementary emitter-follower having an input impedance and a feedback impedance connected thereto, said read pulse being applied to said input impedance and said feedback write amplifier comprising a fourth and fifth transistor, each cooperating as a write complementary emitter-follower, a sixth transistor being connected in a grounded emitter configuration responsive to said write complementary emitter-follower, said sixth transistor receiving its collector voltage through said selected transformer, said write complementary emitter-follower having an input impedance and a feedback impedance connected thereto, said write pulse being applied to said impedance, the voltage appearing across said sampling impedance being selectively applied to said feedback of said read-write complementary emitter-follower in coincidence with said read and write logic pulses.

13. A binary information memory system utilizing one or more coordinates for addressing memory units storing a binary bit of information, plural address conductors passing serially through all of the memory units having an identical coordinate, a separate transformer switch connected to each of said address conductors, one read-write driver electrically connected with said plural transformer switches, an address matrix means for selectively energizing and conductively connecting said one read-write driver to a particular coordinate transformer switch and corresponding address conductor, a sampling impedance, each of said coordinate address conductors being connected to said sampling impedance so that its address current pulse will pass therethrough, said read-write driver being of the feedback type so as to sample the voltage drop across said sampling impedance and control the amplitude of the address current pulse passing through the selected address conductor to a high degree of accuracy, the polarity of said address current pulses being opposite for writing binary information in and reading binary information out of said memory system.

References Cited in the file of this patent

UNITED STATES PATENTS

| | | |
|---|---|---|
| 2,849,703 | Bindon et al. | Aug. 26, 1958 |
| 2,882,519 | Walentine et al. | Apr. 14, 1959 |

UNITED STATES PATENT OFFICE

CERTIFICATE OF CORRECTION

Patent No. 2,988,732 June 13, 1961

Albert W. Vinal

It is hereby certified that error appears in the above numbered patent requiring correction and that the said Letters Patent should read as corrected below.

Column 22, line 29, for "feedback of" read -- feedback impedance of --.

Signed and sealed this 12th day of December 1961.

(SEAL)
Attest:

ERNEST W. SWIDER
Attesting Officer

DAVID L. LADD
Commissioner of Patents

USCOMM-DC